April 30, 1968   F. C. BEURER   3,380,564
ACCESSORY DRIVE FOR SINGLE TURBINE HELICOPTER
Filed April 6, 1966   2 Sheets-Sheet 1
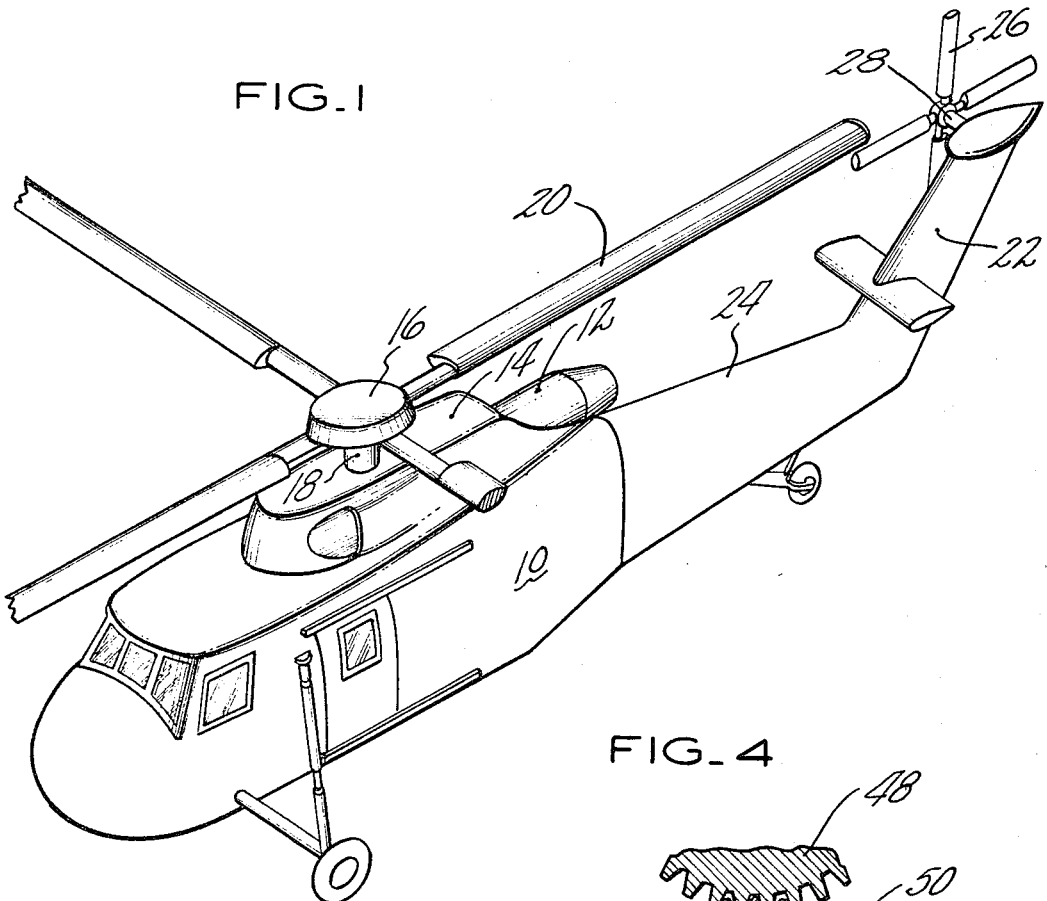
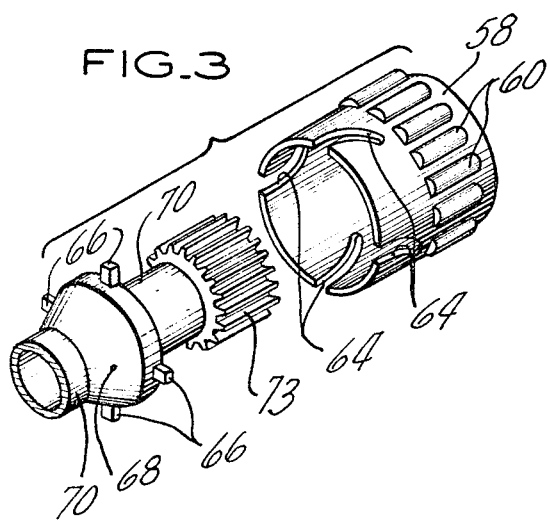
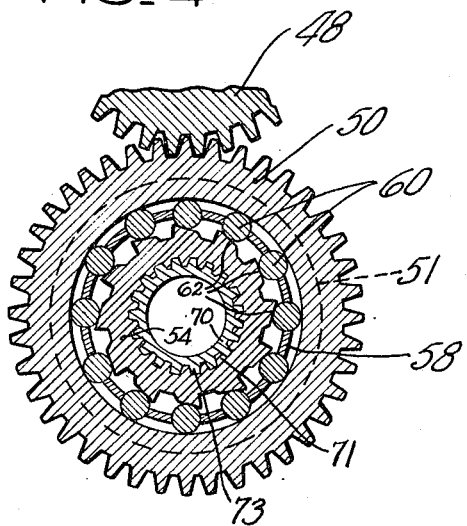
INVENTOR
FREDERICK C. BEURER
BY  M. B. Tasker
ATTORNEY

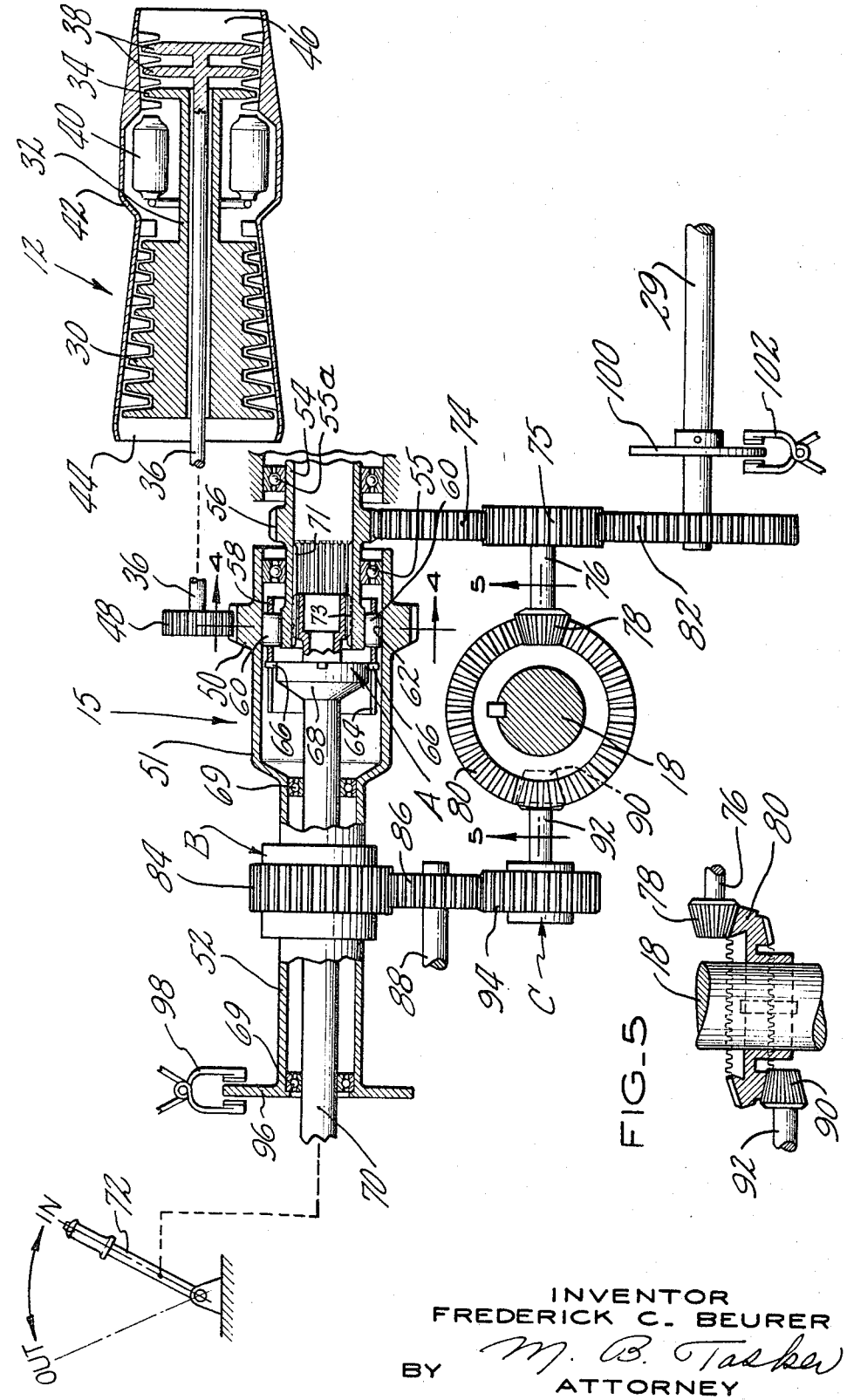

3,380,564
ACCESSORY DRIVE FOR SINGLE TURBINE HELICOPTER

Frederick C. Beurer, Hamden, Conn., assignor to United Aircraft Corporation, East Hartford, Conn., a corporation of Delaware
Filed Apr. 6, 1966, Ser. No. 540,586
1 Claim. (Cl. 192—45)

ABSTRACT OF THE DISCLOSURE

A power transmission system for a helicopter powered by a single free-turbine engine has an intermediate drive shaft between the free-turbine engine drive shaft and the driving train for the main rotor drive shaft and a manually operative selective freewheeling and lock-up device between the intermediate shaft and the drive train. An accessory drive shaft is driven from the intermediate shaft through a freewheeling and lock-up device or, during autorotation, is driven through a freewheeling and lock-up device from the helicopter main rotor drive shaft. A brake is provided to stop the intermediate shaft and connected engine drive shaft when it is desired to lock up the selective freewheeling and lock-up device.

---

This invention relates to a power transmission system for helicopters and particularly such a system for helicopters powered by a single turbine engine.

Before a helicopter can take off in flight it is important first to run the engine with the rotors held stationary and also to check out the engine accessories. In a twin-engine helicopter provision can be made for driving the accessories from one of the engines independently of the other engine and the rotor drive shaft. Subsequently the second engine can be started together with the rotors. When the speed of the two engines have been brought into synchronism, they are connected so as to drive the rotors in unison. Such a transmission system for a two-engine helicopter is shown in my U.S. Patent No. 2,979,968, issued Apr. 18, 1961. It is also possible to equip the helicopter with an auxiliary power unit for driving the accessories on the ground. This, of course, entails additional cost and weight.

It is an object of this invention to provide a transmission system for a helicopter powered by a single turbine engine and without an auxiliary power unit which enables the engine accessories, such as generators, pumps and tachometers to be driven by the engine with the rotors stationary and subsequently to connect the rotors for takeoff.

Another object of this invention is the provision of such a transmission system in a single-engine helicopter having means for connecting the drive shaft of the engine with the rotor drive shaft and disconnecting it from that shaft so that the engine can be used selectively to drive either a group of accessories alone or to drive both the accessories and the rotor drive shaft.

A further object of this invention is the provision of a transmission system as above outlined in which the accessory group can be driven by the engine with the rotor stationary, or from the rotor drive shaft in autorotation.

A still further object of this invention is the provision of a particularly simple and reliable transmission system for a single-turbine-engine-powered helicopter which does not require a source of ground power to enable the engine and its accessories to be ground tested.

A yet further object of this invention is generally to improve the performance and reliability of a single-turbine-engine helicopters.

Other objects and advantages of the invention will become apparent or will be specifically pointed out in the following detailed description of one illustrative embodiment of the invention shown in the accompanying drawings.

In these drawings:

FIG. 1 is a perspective view of a helicopter having a single turbine-engine power plant for driving its rotor system;

FIG. 2 is a schematic plan view, partly in section, of the power plant and transmission system;

FIG. 3 is an exploded detail view of a part of the selective freewheeling unit used in the transmission;

FIG. 4 is a sectional view on line 4—4 of FIG. 2 taken through the selective freewheeling device; and FIG. 5 is a sectional view taken on line 5—5 of FIG. 2.

FIG. 1 shows a helicopter of the single-lift-rotor type but it will be understood that the engine and power transmission combination of this invention can be used in any type of helicopter. Referring to this figure, a helicopter is shown having a body 10 which encloses the pilot and passenger or cargo compartments. The power plant is shown located on top of the body 10 and comprises a single gas-turbine engine 12 mounted aft of the main rotor pylon 14 which encloses the power transmission system generally indicated at 15 (FIG. 2). The main rotor head 16 is supported on the upper end of an upright drive shaft 18 which extends upwardly from the power transmission system. This system is connected between said rotor drive shaft and the gas-turbine engine 12. The rotor head carries rotor blades 20 which are mounted on the rotor head in the usual manner.

A rear pylon 22 extends upwardly from a tail cone 24 and supports an anti-torque tail rotor 26. The tail rotor is mounted on a horizontal shaft 28 which is driven by a fore-and-aft shaft 29 (FIG. 2) extended through the tail cone and is driven through the transmission system 15 hereinafter described. Usual helicopter controls are provided such as are shown in the U.S. patent to Alex, No. 2,811,324.

The engine 12 and the transmission system 15 are shown schematically in FIG. 2. The engine is an axial-flow gas-turbine engine of the free-turbine type in which a multistage compressor 30 is connected by a hollow shaft 32 to a turbine 34, herein shown as a single stage turbine. The turbine driven shaft 36 extends aft through hollow shaft 32 and is connected to a two-stage turbine 38 located aft of turbine 34. The usual fuel burner cans 40 are arranged about the periphery of the burner housing 42 between the compressor and the turbines. Air entering the compressor through the turbine inlet 44 is compressed in the compressor, heated in the burner compartment and, after passing through the turbines, is discharged through the turbine nozzle 46. It will be noted that in a gas-turbine engine of this type the entire power output of the engine is utilized in driving the shaft 36 and that this shaft and its connected turbine 38 are rotationally independent of the compressor 30 and its driving turbine 34.

Turbine driven shaft 36 carries a pinion gear 48 which meshes with a gear 50 formed integral with the enlarged aft end 51 of a hollow, intermediate shaft 52 extended fore-and-aft in the main rotor pylon 14 and suitably supported for rotation in the aircraft. The enlarged end 51 of shaft 52 houses a selective freewheeling and lock-up device A which connects shaft 52 with an inner hollow shaft 54 concentric therewith that carries the main rotor driving pinion 56. Shaft 54 is supported on suitable bearings 55 and 55a located within the enlarged end 51 of shaft 52 and on fixed structure of the aircraft, respectively.

The selective freewheeling and lock-up device A is shown in detail in FIGS. 3 and 4 and includes a sleeve 58 comprising a retainer for a plurality of rollers 60 which, with the sleeve, are located between the inner surface of the enlarged aft end 51 of shaft 52 and a series of peripheral cams 62 on the forward end of shaft 54. Normally, when gear 48 is rotating clockwise (FIG. 4) to drive gear 50 counterclockwise, rollers 60 will engage the inclined cam faces 62 and will drive shaft 54 counterclockwise. However, rotation of shaft 54 in a counterclockwise direction will cause the cam surfaces to move away from the rollers so that shaft 54 will freewheel. This is the normal driving and freewheeling function of this selective freewheeling device A.

In addition to its normal driving and freewheeling function, means are provided for manually disconnecting the drive through device A so that shaft 52 cannot drive inner shaft 54. To this end sleeve 58 is provided with a plurality of spiral slots 64 adapted to receive an equal number of tangs 66 on a head 68 which is mounted on the end of shaft 70. Shaft 70 is mounted for rotation in bearings 69 and is axially reciprocable by a lever 72. The right-hand end of shaft 70 (FIG. 2) is provided with a slightly enlarged, splined portion 73 which extends within hollow shaft 54 and engages elongated splines 71 on the inner surface of shaft 54. Suitable thrust bearings (not shown) engage rotatable shaft 70 with fuselage mounted lever 72. When rollers 60 are in position to drive shaft 54 from shaft 52 and the lever 72 is in the "IN" position, the tangs are in the bottoms of slots 64. The slots are so inclined that when lever 72 is moved to its "OUT" position to move shaft 70 in a forward direction, tangs 66 will bear against the sides of the slots 64 and will move sleeve 58 clockwise as viewed in FIG. 4 to move rollers 60 out of driving contact with cam surfaces 62 on shaft 54.

Main rotor driving pinion 56 drives an idler gear 74 which meshes with a gear 75 mounted on a shaft 76 carrying a beveled pinion gear 78. Gear 78 drives a beveled ring gear 80 (FIG. 5) which is keyed to main rotor drive shaft 18. Gear 75 also meshes with a gear 82 on tail rotor drive shaft 29.

Shaft 52 drives a gear 84 through a freewheeling lock-up device B. This may be a roller clutch similar to the freewheeling and lock-up device A shown in FIG. 4 in which rollers provide the driving connection by being cammed into driving position between shaft 52 and gear 84 when shaft 52 is being driven and providing free movement of gear 84 relative to shaft 52 when the former is being driven.

Gear 84 meshes with a gear 86 on the accessory drive shaft 88 which drives a group of accessories which may include generators, pumps, tachometer, etc. The accessory driving gears have not been shown herein but comprise the usual cluster of accessory driving gears such as are shown in my U.S. Patent No. 2,979,968, issued Apr. 18, 1961.

Means are also provided for driving the accessory drive shaft 88 from the main rotor drive shaft 18 during autorotation. As shown in FIG. 5, ring gear 80 has bevel gear teeth cut on its lower surface which mesh with a bevel gear 90 on shaft 92. Shaft 92 is connected with a gear 94 by a freewheeling and lock-up device C similar to device B above-described. Device C permits shaft 92 when rotated by the rotor to drive gear 94 but does not permit gear 94 to drive shaft 92. Gear 94 meshes with accessory drive gear 86, thus enabling the accessories to be driven by the rotor drive shaft during autorotation of the main rotor.

As previously explained, the compressor 30 and its driving turbine 34 rotate independently of the turbine-driven shaft 36 and its turbine 38. This permits shaft 52 which is connected to the turbine-driven shaft 36 to be stopped while the compressor and its connected turbine continue to rotate. To accomplish this a disc brake is provided for shaft 52 consisting of a disc element 96 on the shaft and caliper brake elements 98 which may be manually operated when it is desired to stop the turbine-driven shaft for purposes hereinafter described. A similar disc element 100 and caliper brake elements 102 are provided on shaft 29 for holding the main and tail rotors stationary when desired.

The operation of the transmission system of this invention is as follows. First the brake elements 102 are operated to apply the main and tail rotor brake, if this brake is not already on. Lever 72 is then moved to its "OUT" position in which shaft 70 is moved axially forward. Head 68 moves forward, i.e., to the left in FIG. 2 and, as tangs 66 move from the bottoms of slots 64, they cam sleeve 58 clockwise (FIG. 4) to move rollers 60 away from inclined cam faces 62 and disconnect the drive from shaft 52 to shaft 54. In this position of lever 72 the selective freewheeling and lock-up device A cannot transmit power from shaft 52 to shaft 54 to drive the rotors.

The engine is now started and since there is a driving connection from shaft 36 through gears 48, 50, device B, and gears 84, 86 to the accessory drive shaft 88, the pilot can check the various accessories to make sure they are operating properly. While the accessories are being driven, gear 94 will rotate but, because its freewheeling and lock-up device C is freewheeling, shaft 92 and rotor drive shaft 18 will not be driven.

When it is desired to connect the rotors and take off, the engine is throttled to idling speed and brake 102 is released. Brake 98 is then applied momentarily to stop shaft 52, engine drive shaft 36 and accessory drive shaft 88. The brake is applied only long enough to bring shafts 52, 36 and 88 to a stop and to move lever 72 to its "IN" position in which the selective freewheeling and lock-up device A is locked up to connect shafts 52 and 54. Brake 98 is then released and, as turbine-driven shaft 36 begins to rotate, it drives the rotors through gears 48, 50, device A, shaft 54, gears 56, 74, and gear 75 which drives both the main and anti-torque rotors. This momentary stopping of the turbine shaft and the accessory shaft 88 is made possible by the use of a free-turbine engine which permits the compressor and its driving turbine stage to continue to rotate while shaft 36 is held stationary.

As the engine is brought up to speed with lever 72 in its "IN" position, both rotors will be driven and the accesories will be driven. Device C will, however, be freewheeling. If the gear ratios of the accessory drive through shaft 52 to shaft 88 should be designed so as to be lower in ratio than that of the gears driving the accessory shaft through the main rotor ring gear 80, then the accessories would be driven from the main rotor ring gear and device B would freewheel. If device C fails, the presence of shaft 70 serves as a redundant feature to keep the accessories in operation.

In autorotation, when the engine is stopped or is rotating too slowly to sustain flight, the power to drive the accessories is obtained from the main rotor ring gear 80 which drives pinion 90, shaft 92, device C, gears 94, 86, and accessory drive shaft 88. During autorotation, device B will freewheel and device A will also freewheel so there is no driving connection from the autorotating main rotor to shaft 52.

While only one embodiment of the invention has been described for purposes of illustration it will be understood that many changes in the construction and arrangement of the parts is possible without exceeding the scope of the following claims.

I claim:
1. In a helicopter, a rotor drive shaft, an accessory drive shaft, a tubular intermediate drive shaft having a first driving connection with said accessory drive shaft including a freewheeling and lock-up device and a second driving connection with said rotor drive shaft including a selective freewheeling and lock-up device having engageable and disengageable lock-up elements and means for selectively holding said elements disengaged or allowing them to engage, a gas turbine engine having a free turbine and a drive shaft connected to said free turbine, said turbine shaft having a driving connection with said intermediate shaft, said intermediate shaft having its bore enlarged at one end to provide a chamber for said selective freewheeling and lock-up device, a hollow internal shaft journalled within said intermediate shaft including the driven element of said selective freewheeling and lock-up device located in said chamber and a gear external of said chamber which is in said second driving connection between said intermediate shaft and said rotor, said internal shaft having elongated splines on its inner surface, a sleeve in said chamber carrying elements of said selective freewheeling and lock-up device, an actuating member extended through the bore of said tubular intermediate shaft having an enlarged splined portion engageable with the splines on said internal shaft, means on said actuating member for disengaging said lock-up elements upon axial movement of said actuating member in one direction and for holding them disengaged, and brake means for holding said intermediate shaft momentarily while said lock-up elements of said selective freewheeling and lock-up device are engaged by axial movement of said actuating member in the other direction.

References Cited
UNITED STATES PATENTS

| | | | |
|---|---|---|---|
| 1,929,503 | 10/1933 | Ljungstrom | 192—44 |
| 2,644,535 | 7/1953 | Koup | 192—3.26 |
| 2,979,968 | 4/1961 | Beurer | 74—679 |
| 3,234,902 | 2/1966 | Booth | 60—39.16 |

CARLTON R. CROYLE, *Primary Examiner.*

MARK M. NEWMAN, *Examiner.*

C. M. LEEDOM, *Assistant Examiner.*